(12) United States Patent
Schmidt et al.

(10) Patent No.: US 9,506,573 B2
(45) Date of Patent: Nov. 29, 2016

(54) HYDRAULIC VALVE FOR PREVENTING LEAKAGE IN AN ACTUATOR FOR ACTIVATING A HIGH- OR MEDIUM-VOLTAGE CIRCUIT BREAKER

(71) Applicant: ABB Technology AG, Zurich (CH)

(72) Inventors: Matthias Schmidt, Frankfurt (DE); Niko Robens, Aachen (DE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 14/687,713

(22) Filed: Apr. 15, 2015

(65) Prior Publication Data

US 2015/0300510 A1 Oct. 22, 2015

(30) Foreign Application Priority Data

Apr. 16, 2014 (EP) ..................................... 14164887

(51) Int. Cl.
| | |
|---|---|
| *F16K 15/00* | (2006.01) |
| *F16K 11/056* | (2006.01) |
| *H01H 33/34* | (2006.01) |
| *F15B 13/042* | (2006.01) |

(52) U.S. Cl.
CPC ............. *F16K 11/056* (2013.01); *H01H 33/34* (2013.01); *F15B 13/042* (2013.01)

(58) Field of Classification Search
USPC ................................ 137/87.04, 512.1, 493.9
See application file for complete search history.

(56) References Cited

U.S. PATENT DOCUMENTS

| | | | | |
|---|---|---|---|---|
| 2,265,117 A | | 12/1941 | Seymour | |
| 2,418,634 A | * | 4/1947 | Hallerstrom | ......... G05D 7/0126 |
| | | | | 137/493.9 |
| 2,716,995 A | * | 9/1955 | Baugh | ........................ F15B 7/06 |
| | | | | 137/106 |
| 3,568,710 A | * | 3/1971 | Boyer | ...................... F02C 7/232 |
| | | | | 137/493.9 |
| 3,856,361 A | | 12/1974 | Swanson | |
| 3,880,185 A | * | 4/1975 | Harrison | ................ B60T 11/101 |
| | | | | 137/112 |
| 4,033,375 A | * | 7/1977 | Hirsch | ................... F16K 15/044 |
| | | | | 137/493.9 |
| 4,289,063 A | * | 9/1981 | Nakamura | ............. H01H 33/34 |
| | | | | 91/306 |
| 4,562,861 A | * | 1/1986 | Payton | ................... F16K 15/026 |
| | | | | 137/493.9 |
| 4,616,674 A | * | 10/1986 | Bardoll | ................. F15B 13/042 |
| | | | | 137/596.16 |
| 6,789,567 B2 | * | 9/2004 | Meyer | ................... F16K 15/142 |
| | | | | 137/269.5 |
| 7,513,111 B2 | * | 4/2009 | Daigre | ................ F16H 61/4043 |
| | | | | 137/493 |

(Continued)

FOREIGN PATENT DOCUMENTS

| | | |
|---|---|---|
| DE | 10 2009 053 901 B3 | 4/2011 |
| EP | 0061786 A1 | 10/1982 |

(Continued)

*Primary Examiner* — John Fox
(74) *Attorney, Agent, or Firm* — Barnes & Thornburg LLP

(57) ABSTRACT

A hydraulic valve for connecting a first fluid-conducting pressure line to a second fluid-conducting pressure line in an actuator for activating a high- or medium-voltage circuit breaker includes a housing with a first channel inlet for attachment to the first pressure line, and with a second channel inlet for attachment to the second pressure line, and a cavity situated between the first and the second channel inlet. The hydraulic valve includes a sealing body which can move in the cavity and has a circumference which is greater, at least at one point, than the respective circumference of openings adjoining the cavity, of the first and the second channel inlets. The sealing body is geometrically matched to the cross-section of these openings to completely seal the openings when seated. First and second spring elements connected to the sealing body project into the cavity in the relaxed state.

9 Claims, 4 Drawing Sheets

(56) References Cited

U.S. PATENT DOCUMENTS

2010/0243927 A1 9/2010 Wahlefeld et al.
2012/0280152 A1 11/2012 Schmidt et al.

FOREIGN PATENT DOCUMENTS

EP 0461390 A1 12/1991
EP 2 234 135 A2 9/2010

* cited by examiner

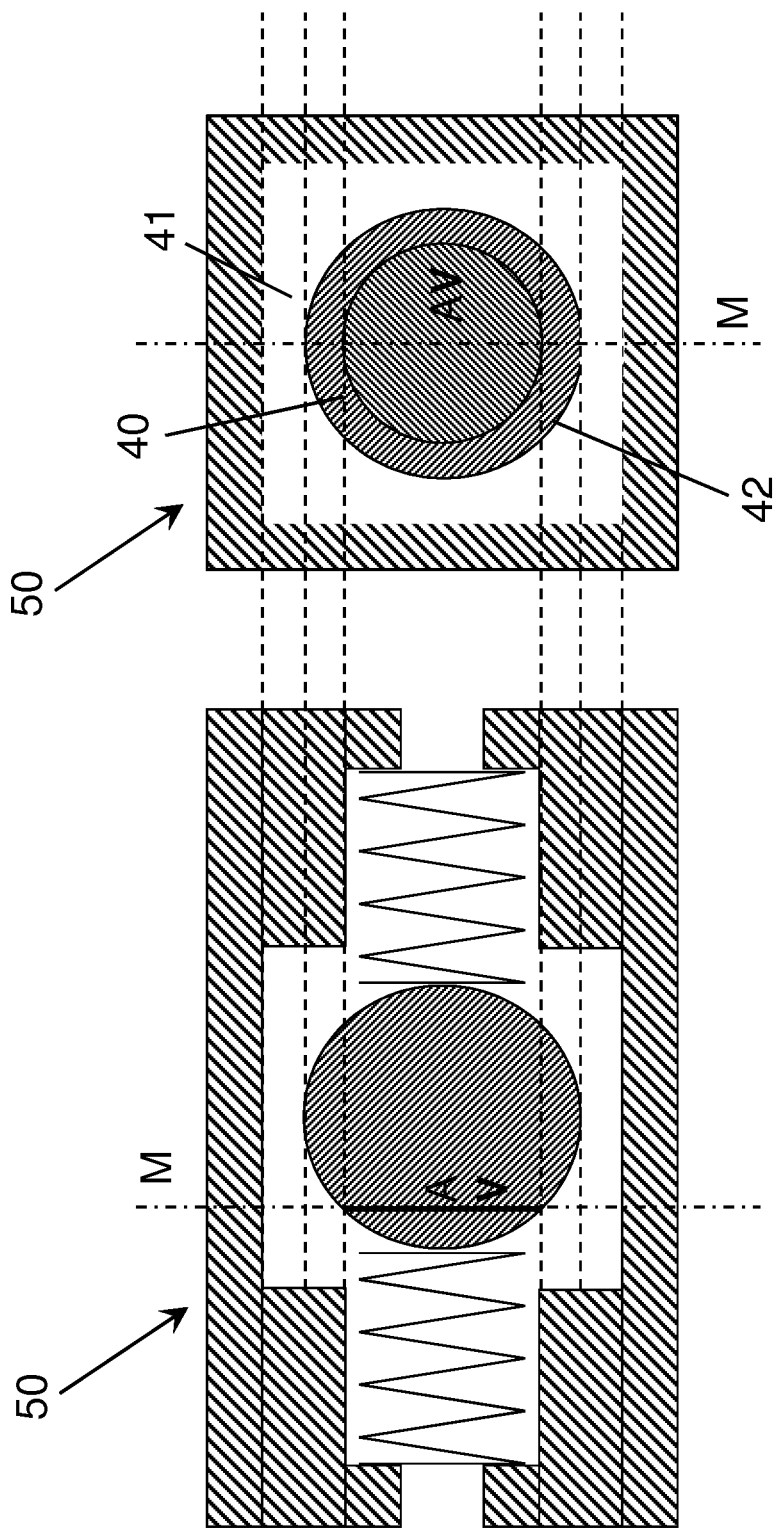

*US 9,506,573 B2*

HYDRAULIC VALVE FOR PREVENTING LEAKAGE IN AN ACTUATOR FOR ACTIVATING A HIGH- OR MEDIUM-VOLTAGE CIRCUIT BREAKER

RELATED APPLICATION(S)

This application claims priority under 35 U.S.C. §119 to European Patent Application No. 14164887.3 filed in Europe on Apr. 16, 2014, the entire content of which is hereby incorporated by reference in its entirety.

FIELD

The disclosure relates to the area of hydraulically controlling a piston/cylinder arrangement by a valve arrangement, wherein the valve arrangement is part of an actuator for activating a high- or medium-voltage circuit breaker, and for taking countermeasures when leaks occur inside the valve arrangement.

BACKGROUND INFORMATION

Two-stage valve arrangements for activating a piston of a hydraulic actuator are known from EP 2 234 135 B1 and DE 10 2009 053 901 B3, respectively, wherein the hydraulic actuator is provided for activating a high-voltage circuit breaker. The valve stages include a pilot stage and a main stage.

The valve arrangement from EP 2 234 135 B1 includes a 3/2-port valve as a pilot valve and two 2/2-port valves as main valves, whereas in the valve arrangement from DE 10 2009 053 901 B3 two 2/2-port valves are also present as main valves but the function of the 3/2-port pilot valve is performed by two 2/2-port valves as pilot valves.

The valve arrangement from EP 2 234 135 B1, together with the piston/cylinder arrangement controlled by the valve arrangement and with the high-voltage circuit breaker which is to be activated, is shown in FIG. 1. The valve arrangement and piston/cylinder arrangement are jointly part of a hydraulic actuator for activating the high-voltage circuit breaker.

In a first position of the pilot valve 11, the port from a high-pressure tank 9, via the main valve 2, to the space 10 situated in the piston/cylinder arrangement 12 is opened. i.e. the fluid which is at high pressure is supplied to the space 10 above the piston 6 so that the high-voltage circuit breaker 7 is closed. The fluid can be a hydraulic oil. In a second position of the pilot valve 11, the space 10 is connected to a low-pressure tank 8 via the main valve 1, i.e. the space 10 above the piston 6 is depressurized, as a result of which the piston 6 moves backwards and opens the high-pressure circuit breaker 7.

The valve arrangement from DE 10 2009 053 901 B3 can be seen in FIG. 2, together with the piston/cylinder arrangement 12 of the hydraulic actuator and with the circuit breaker 7 which is to be activated. Identical elements to those in FIG. 1 carry the same reference numerals, and the fundamental mode of operation of the valve arrangement is the same as described above for FIG. 1.

The pilot valves 3 and 4 in FIG. 2 take the form of NC valves which are electrically activated and have a spring return. Owing to the spring return which is required for technical reasons, after switching the situation always occurs in which an enclosed oil volume, which is responsible for the correct positioning of the valves 1 and 2 of the main stage for the period until the next switching event, exists in the pilot region, i.e. in the hydraulic region of the pilot stage.

The 2/2-port valves 3 and 4 of the pilot stage can have leaks. Depending on the switching position, the internal leakage at the pilot valves 3 and 4 can now result in an undesired build-up or reduction of pressure, which could compromise the correct positioning of the main valves 1 and 2.

This should be prevented as otherwise the main stage could malfunction and hence the actuator and the high-voltage circuit breaker could malfunction.

This issue is addressed in DE 10 2009 053 901 B3 by incorporating a small aperture 5 between the pilot region, i.e. the hydraulic region in which the oil is enclosed, and the main region, i.e. the region which actuates the main piston 6. Specifically, the aperture 5 is situated between the outlet side X, connected to the control inlets of the main valves 1, 2, of the pilot valves 3, 4, and the outlet side Z, connected to the piston/cylinder arrangement 12, of the main valves 1, 2.

Such a connection between the pilot region and the main region is, however, undesirable during switching as the aim is precisely that the two regions operate hydraulically independently of each other (cf also FIG. 1).

In the static situation, when there is therefore no switching, the aperture does, however, help that any leaks which may possibly exist are compensated, wherein the fact is exploited that, in the static situation, the same pressure always prevails in the pilot region and in the main control region, and that the main control region is not sealed and hence capable of compensating the leaks which have occurred. As there are very low volume flows in the static situation, the aperture functions like an open connection between the main and the pilot control region, i.e. a flow of oil from the pilot region caused by a leak can pass via the aperture into the main control region and be discharged there.

The aperture is designed to be as small as possible so that this open connection does not result in an adverse effect on the functioning of the valve arrangement during switching, i.e. in a dynamic situation. The effect of significant and widely varying differences in pressure prevailing between the main and the pilot region, as a result of which very large volume flows occur at the main valves, is thus exploited. Owing to the very small size of the outlet opening of the aperture in comparison with the respective known opened valve and because everything happens extremely quickly in the dynamic situation, the aperture then acts like a separator between the main and the pilot region.

Accordingly, the aperture fundamentally separates the main and the pilot region in the dynamic situation and provides a low-loss connection between the main and the pilot region in the static situation.

The aperture therefore represents in each case a compromise between "as small as possible" for the dynamic situation and "as large as possible" for the static situation. It has now been proved in practical tests that this compromise may not be sufficient in individual cases.

SUMMARY

A hydraulic valve is disclosed for connecting a first fluid-conducting pressure line to a second fluid-conducting pressure line in an actuator for activating a high- or medium-voltage circuit breaker, the hydraulic valve comprising: a housing with a first channel inlet for attachment to the first pressure line, and a second channel inlet for attachment to the second pressure line, and a cavity situated between the first and the second channel inlets; a sealing body configured to be moveable in the cavity and having a circumference which is greater, at least at one point, than a respective circumference of openings, adjoining the cavity, of the first and the second channel inlets, wherein the sealing body is geometrically matched to a cross-section of these openings such that it completely seals the openings when seated on the openings; a first spring element, fastened in the first channel inlet opening, connected to the sealing body on a first side and projecting into the cavity in a relaxed state; and a second spring element, fastened in the second channel inlet opening, connected to the sealing body on a second side and projecting into the cavity in a relaxed state.

BRIEF DESCRIPTION OF THE DRAWINGS

The disclosure and its exemplary embodiments are described in detail with the aid of the exemplary embodiments shown in the further drawings, in which:

FIGS. 5a, 5b show a view in section of the hydraulic valve from FIG. 4.

DETAILED DESCRIPTION

Figure 3:
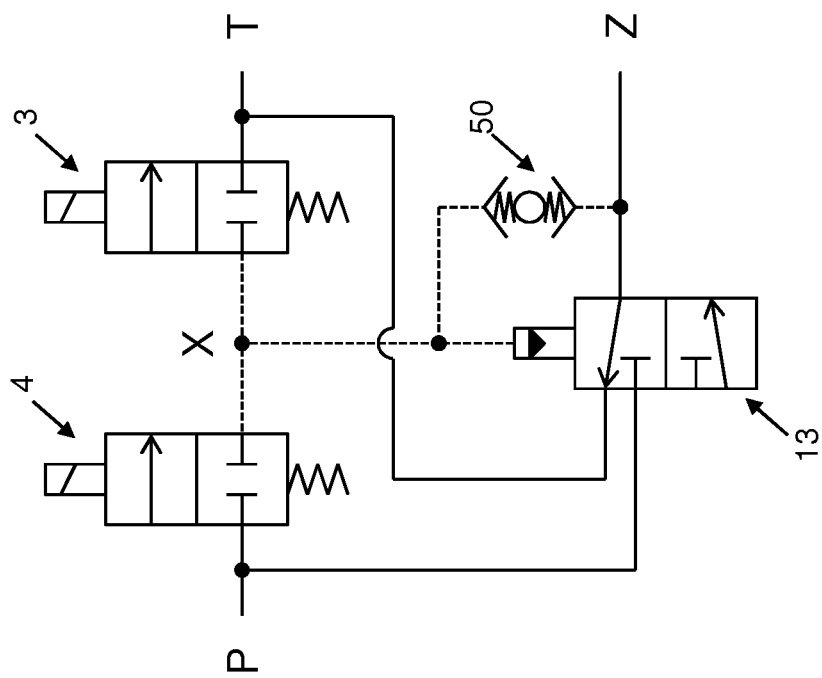
FIG. 3 shows a third two-stage valve arrangement with a hydraulic valve for discharging a leakage flow.

Exemplary embodiments of the disclosure provide an alternative option by which leaks from the pilot region of a two-stage valve arrangement can be discharged via the main control region in order to activate a piston of a hydraulic actuator, without thereby negatively affecting the switching state.

This can be achieved by a hydraulic valve for connecting a first fluid-conducting pressure line to a second fluid-conducting pressure line in an actuator in order to activate a high- or medium-voltage circuit breaker, including, a housing with a first channel inlet for attachment to the first pressure line, and a second channel inlet for attachment to the second pressure line, and a cavity situated between the first and the second channel inlet. A sealing body can move in the cavity and has a circumference which is greater, at least at one point, than the respective circumference of the opening, adjoining the cavity, of the first and the second channel inlet. The sealing body is geometrically matched to the cross-section of these openings such that it can completely seal it when it sits on it, a first spring element, fastened in the first channel opening, which is connected to the sealing body on a first side and projects into the cavity in the relaxed state, a second spring element, fastened in the second channel opening, which is connected to the sealing body on a second side and projects into the cavity in the relaxed state.

The channel inlets of the hydraulic valve and provided in each case to be connected to a pressure line. The pressure lines can here be designed as channels within a housing block or as external pressure lines.

The housing of the hydraulic valve described here can accordingly enclose a self-contained part or it can be an integrated component of a further larger housing block including further hydraulic elements.

The valve thus has two channel inlets and hence connections and includes a sealing body which is arranged so that it can move inside a cavity of a housing and is tensioned between two spring elements in such a way that, in the event of a previously known difference in pressure between the two channel inlets, it is held between the two openings, adjoining the cavity, of the channel inlets. In this situation, the flow can thus pass through the valve in both directions. The openings, adjoining the cavity, of the channel inlets are also referred to as valve seats.

The hydraulic valve can accordingly be used in a valve arrangement between two pressure lines, and to be precise with the purpose of permitting passage up to a predefined volume flow or up to a predefined difference in pressure, and of disconnecting the two pressure lines from each other above this predefined volume flow or this predefined difference in pressure, wherein in this way the hydraulic valve can be effective in both directions of the volume flow.

In the static situation, the proposed hydraulic valve then keeps the connection between the pressure lines open because the sealing body is held by the spring elements in such a way that it is kept at a distance from both valve seats. The design of the spring elements is accordingly adapted to the predefined difference in pressure at which it is intended for disconnection to occur, and to the geometry of the cavity and to the pressure ratios in the dynamic situation. This can mean that the spring elements can be designed with different stiffness so as to thus be able to close, for example, at different volume flows depending on the direction.

Because the connecting path between the pressure lines is kept open in the static situation, a fluid flow caused by a leak can, in the static situation, pass from a self-contained region through the valve into a region which is not closed off hydraulically and hence be discharged. In the dynamic situation of the valve arrangement, the change in the difference in pressure occurring between the pressure lines acts on the sealing body and moves it to sit on one of the valve seats so that the pressure lines are disconnected from each other.

The hydraulic valve can thus completely replace the aperture in the above-described application. The disadvantage of the aperture that its passage cross-section cannot be selected to be too large, in order to ensure a reliable disconnection of the pressure lines in the dynamic situation, does not apply in the case of the hydraulic valve. Instead, in the case of the design of the hydraulic valve proposed here, an opening cross-section which is sufficiently large to discharge leaks can be selected because in the dynamic situation the opening cross-section can in each case be reliably sealed by the sealing body. The design of the leak-discharging component for adaptation to the actual physical circumstances in the surrounding valve arrangement is thus greatly simplified.

For use in a valve arrangement in which it is desired that the hydraulic valve acts in the same way in both directions of flow, and that it therefore generates the same losses and closes at the same volume flows, the first and the second channel opening are designed to have the same size relative to each other, and the first and the second spring element have identical designs.

The openings, adjoining the cavity, of the first and the second channel inlet can preferably each have a circular design. On each of its sides connected to the spring elements, the sealing body then has at least one circular cross-sectional area which in each case corresponds exactly to the cross-sectional area of the associated opening. Other designs of the channel inlet openings, and therefore of the valve seats, and of the sealing body is conceivable. For example, the cross-sections could also have an elliptical form.

In the case of circular valve seats, the first and the second side of the sealing body could take the form of a spherical segment because then, even in the case of manufacturing tolerances, it is ensured that the respective channel inlets are effectively sealed. In its simplest form, the sealing body can take the form of a sphere. However, an elongated design which differs from the spherical form, with spherical ends attached thereto, is also conceivable, for example a cylinder or an ellipsoid.

The hydraulic valve can advantageously be arranged in a two-stage valve arrangement for activating a piston of a hydraulic piston/cylinder arrangement. The valve arrangement includes a pilot stage with at least one pilot valve, and a main stage with at least one main valve. The valve arrangement is thus designed in such a way that, in a first position of the at least one pilot valve, a hydraulic connection is established from a high-pressure tank to the piston/cylinder arrangement via the main stage so that a fluid at high pressure is supplied to a space situated on one side of the piston and, in a second position of the at least one pilot valve, the space situated on one side of the piston is connected to a low-pressure tank via the main stage. The above-described hydraulic valve is arranged between an outlet side, connected to at least one control inlet of the main stage, of the pilot stage, and an outlet side, connected to the piston/cylinder arrangement, of the main stage.

In an exemplary embodiment of the disclosure, the pilot stage contains two 2/2-port valves which can be designed in particular as electrically activated valves with a spring return which are closed in the rest position, also called NC valves.

The two-stage valve arrangement with the hydraulic valve proposed here can advantageously be incorporated in a hydraulic actuator for activating a high- or medium-voltage circuit breaker because in the high- or medium-voltage range for safety reasons it is particularly important that operational faults caused by leaks are avoided. The high-voltage range here includes voltage levels between approximately 50 kV and currently 1100 kV, and the medium-voltage range lies approximately between 1 kV and 50 kV. Circuit breakers can be, for example, isolators, earthing switches, high-speed earthing switches or combined earthing switches and isolators.

Figure 4:
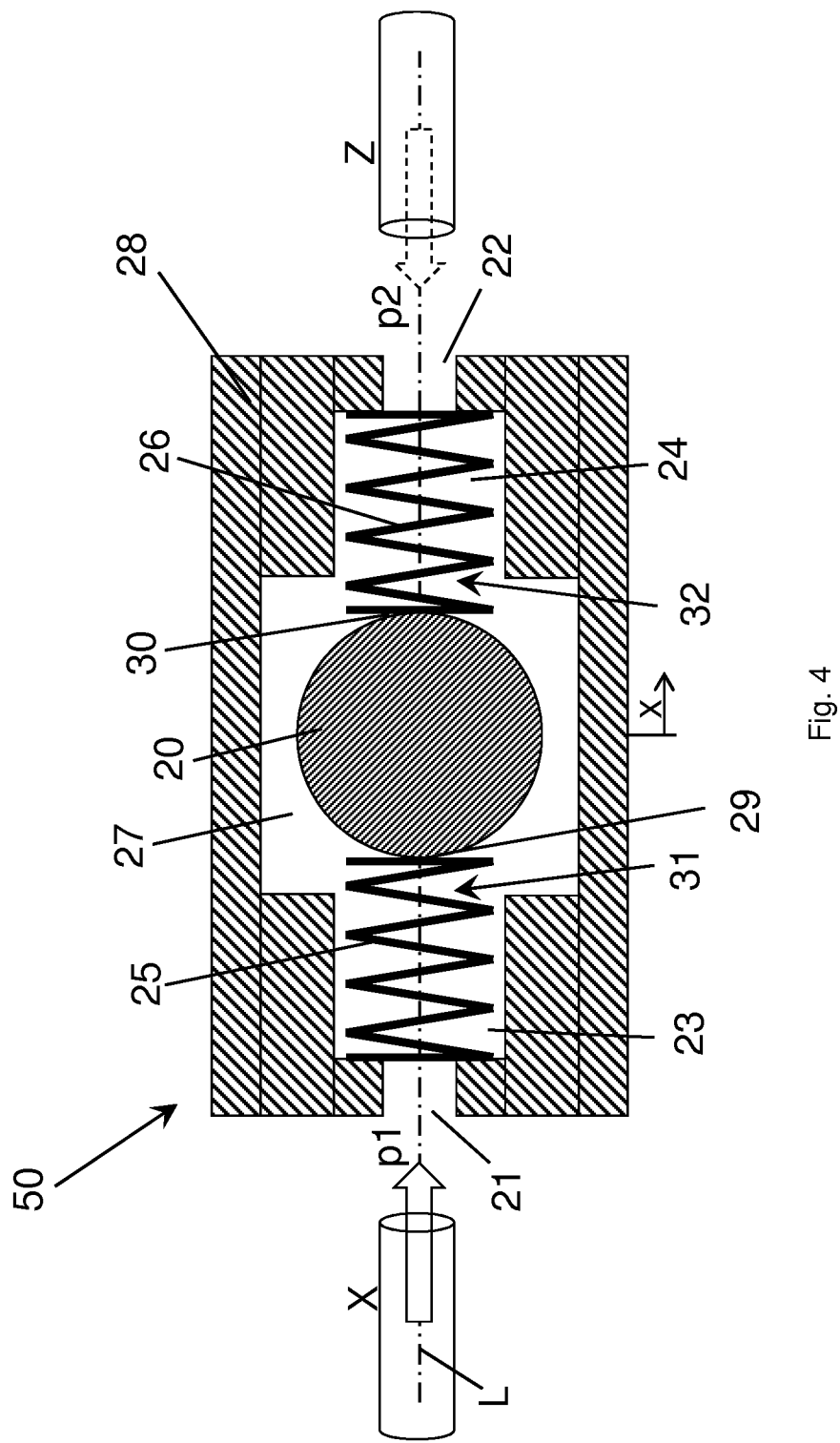
FIG. 4 shows a symmetrically designed hydraulic valve with a spherical sealing body according to an exemplary embodiment of the disclosure.

The hydraulic valve 50 shown in FIG. 4 serves to connect a first fluid-conducting pressure line X to a second fluid-conducting pressure line Z and includes a casing 28 with a design which is symmetrical with respect to the longitudinal axis L in the plane of the drawing. Two outward-facing connecting openings 21, 22 which are here directly opposite each other are incorporated into the casing 28. They could, however, also be introduced into the casing 28 in any other arrangement. A first 21 of the connecting openings is provided for connecting the valve to a first pressure line X, and a second connecting opening 22 is provided for connection to a second pressure line Z. A first and a second spring guide channel 23, 24, which both open into a cavity 27, each adjoin the connecting openings 21, 22.

The first connecting opening 21 forms, together with the first spring guide channel 23, a first channel inlet for connection to the first pressure lien X, and the second connecting opening 22 forms, together with the second spring guide channel 24, a second channel inlet for connection to the second pressure line Z.

A sealing body 20, which is fastened to two spring elements 25, 26, is provided in the cavity. The first of the two spring elements 25 can be fastened with one of its ends in the first channel opening, wherein, in the embodiment shown here, it is fastened in the first spring guide channel 23. The other end of the first spring element 25 can be fastened to a first side 29 of the sealing body 20. In a similar manner, the second of the two spring elements 26 can be fastened with one of its ends in the second channel opening, wherein, in the embodiment shown here, it is fastened in the second spring guide channel 24. The other end of the second spring element 25 can be fastened to a second side 30 of the sealing body 20. In the embodiment shown here, the first and the second side of the sealing body 29, 30 are opposite each other. Other arrangements are, however, also conceivable. The first and the second spring element 25, 26 each project, in the relaxed state, into the cavity 27. Apart from being fastened to the two spring elements 25, 26, the sealing body 20 can move freely inside the cavity 27.

The sealing body 20 takes the form of a sphere with a circumference which is greater than the respective circumference of the openings 31, 32, adjoining the cavity, of the first and the second channel inlet. The openings 31, 32 have a circular cross-section and are also referred to as valve seats. Accordingly, because of its spherical form, the sealing body 20 geometrically adapted to the cross-section of the openings 31, 32 in such a way that it can completely seal the openings 31, 32 when it is seated on each of them. The cross-sectional area AV which seals the openings 31, 32 can be seen in FIG. 5b which shows a view in section through the hydraulic valve 50 along the line of section M from FIG. 5a. Also visible in the view in section are the circumference 42 of the sealing body 20, and its maximum cross-sectional area 40, and the passage cross-section 41 which can be configured to be greater than in the case of the aperture described at the beginning.

The hydraulic valve 50 in FIG. 4 has a symmetrical structure, i.e. the design of the following elements is the same in size and identical. The first and the second connecting opening 21, 22, the first and the second spring guide channel 23, 24, and the first and the second spring element 25, 26.

Figure 1:
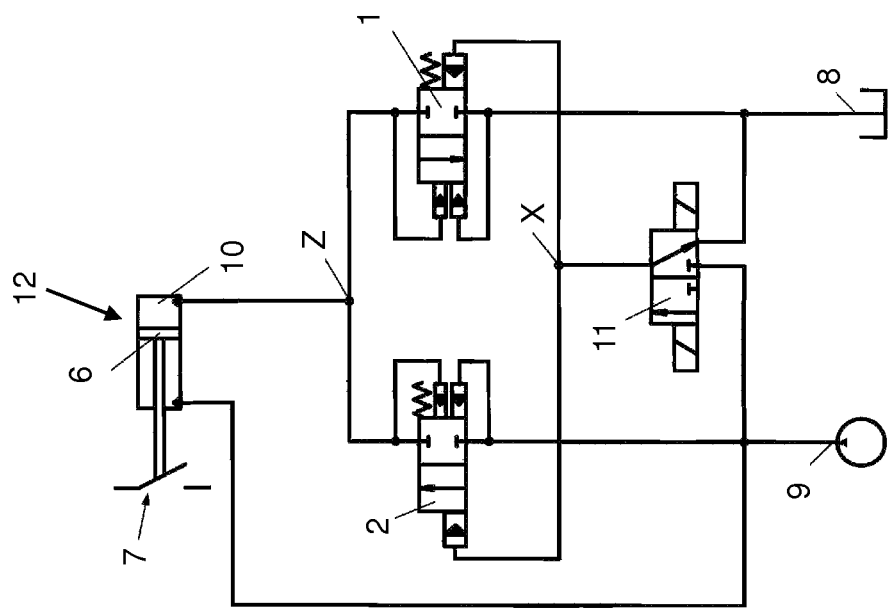
FIG. 1 shows a first known two-stage valve arrangement for activating a piston and hence a high-voltage circuit breaker.
Figure 2:
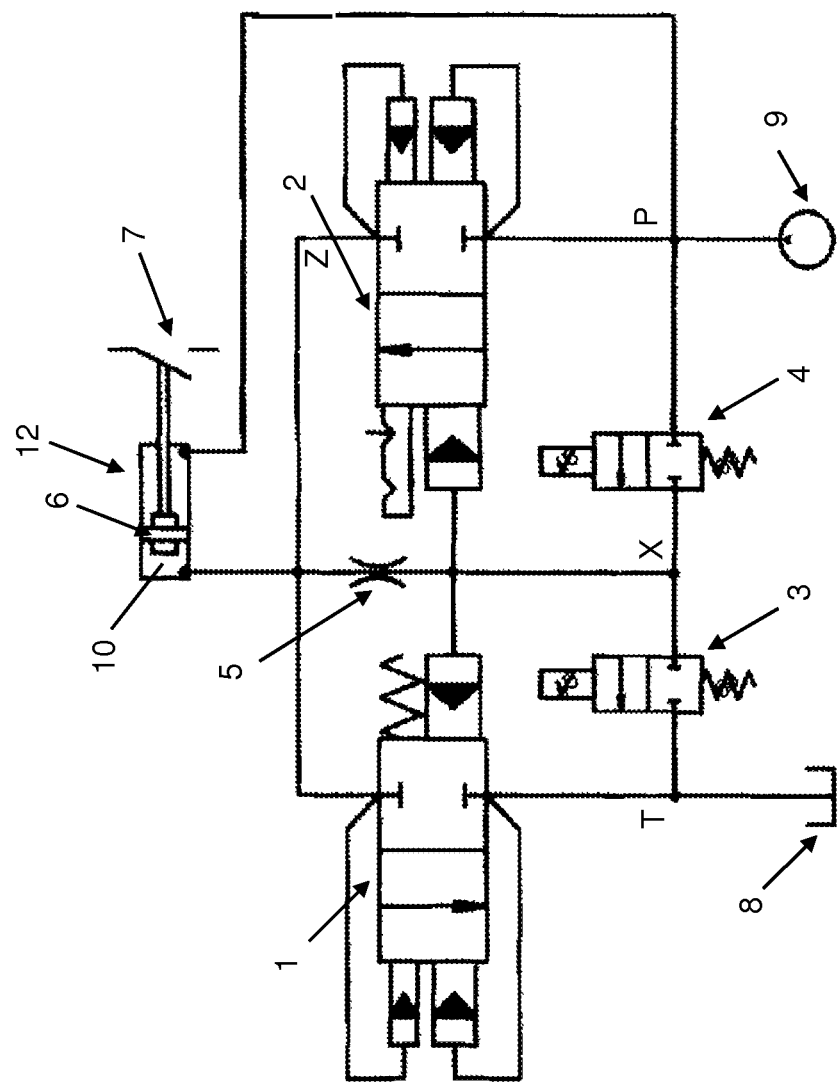
FIG. 2 shows a second known two-stage valve arrangement with an aperture for discharging a leakage flow.

The hydraulic valve 50 from FIG. 4 can thus be particularly advantageously suitable for installation in a two-stage valve arrangement according to, for example, FIG. 1, 2 or 3, wherein the two-stage valve arrangement is provided in each case for activating a piston 6 of a hydraulic piston/cylinder arrangement 12, and the piston 6 in turn activates a high-voltage circuit breaker 7. In the valve arrangements according to FIG. 1, 2 or 3, the hydraulic valve 50 would in each case be provided between the first pressure line X and the second pressure line Z. In FIG. 2, it would accordingly replace the aperture 5.

The two-stage valve arrangements in each case can include a pilot stage with at least one pilot valve (3, 4, 11) and a main stage with at least one main valve (1, 2, 13), wherein, in a first position of the at least one pilot valve, a hydraulic connection is established between a high-pressure tank 9 and the piston/cylinder arrangement 12 via the main stage so that a fluid at high pressure is supplied to a space 10 situated on one side of the piston 6, and wherein, in a second position of the at least one pilot valve, the space 10 situated on one side of the piston 6 is connected to a low-pressure tank 8 via the main stage.

The hydraulic valve 50 is arranged inside this respective valve arrangement between an outlet side X of the pilot stage connected to at least one control inlet of the main stage, and an outlet side Z of the main stage connected to the piston/cylinder arrangement 12. The other labelled pressure lines relate to the line P connecting to the high-pressure tank 9, and to the line T connecting to the low-pressure tank 8.

In the static state of the valve arrangements according to FIGS. 1, 2 and 3, in other words when the high-voltage circuit breaker 7 has not been activated, the pressure p1 present in the first pressure line X is of the same magnitude as the pressure p2 present in the second pressure line Z. Both the pressure lines and channels can therefore, depending on the position of the high-voltage circuit breaker 7, be at the same high-pressure level or not be pressurized at all. As a result and owing to the symmetrical design of the hydraulic valve 50, in the static situation the sealing body 20 is centred between the two valve seats (31, 32) centrally inside the cavity 27.

If a volume flow now occurs because of an internal or external leak, at narrow cross-sections through which the flow passes inside the valve arrangement it can cause differences in pressure which, in the worst-case scenario, can cause the opened valve cartridges to close, which can cause a serious malfunction of the high-voltage circuit breaker. Such a volume flow caused by a leak can, however, as indicated by the block arrows in FIG. 4, then pass through the hydraulic valve 50 in both directions, and hence pass into a region of the valve arrangement in which it can be discharged, which compensates for the leaks and hence avoids the occurrence of undesired differences in pressure. Where the leak is discharged to depends on the respective switched position of the high-voltage circuit breaker. In the "On" position, X and Z are at high pressure. A leak from X to T can now occur in the X region. The volume lost by the leak is then fed from Z through the hydraulic valve 50. In the "Off" position, X and Z are unpressurized. A leak from P to X can now occur in the X region. This volume is then discharged through the hydraulic valve 50 into the Z region and from there into the low-pressure tank.

In the dynamic state of the valve arrangements in FIGS. 1, 2 and 3, in other words whilst the piston 6 and hence the high-voltage circuit breaker 7 are being activated, the pressure p1 will differ abruptly from the pressure p2. The hydraulic valve 50 is caused to close by virtue of this difference in pressure which suddenly occurs. As long as the pressure p1 present at the first pressure line X is greater than the pressure p2 present at the second pressure line Z, the hydraulic valve 50 is sealed by the sealing body 20 being seated on the opening 32 of the second channel inlet and, in the opposite pressure conditions, by the sealing body 20 being seated on the opening 31 of the first channel inlet.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A hydraulic valve for connecting a first fluid-conducting pressure line to a second fluid-conducting pressure line in an actuator for activating a high- or medium-voltage circuit breaker, the hydraulic valve comprising:
    a housing with a first channel inlet for attachment to the first pressure line, and a second channel inlet for attachment to the second pressure line, and a cavity situated between the first and the second channel inlets;
    a sealing body configured to be moveable in the cavity and having a circumference which is greater, at least at one point, than a respective circumference of openings, adjoining the cavity, of the first and the second channel inlets, wherein the sealing body is geometrically matched to a cross-section of these openings such that it completely seals the openings when seated on the openings;
    a first spring element, fastened in the first channel inlet opening, connected to the sealing body on a first side and projecting into the cavity in a relaxed state; and
    a second spring element, fastened in the second channel inlet opening, connected to the sealing body on a second side and projecting into the cavity in a relaxed state.

2. The hydraulic valve according to claim 1, wherein the first and the second channel inlet openings are configured to have a same size relative to each other, and the first and the second spring element are identical.

3. The hydraulic valve according to claim 1, wherein the openings adjoining the cavity of the first channel inlet and the second channel inlet, in each case has a circular design, and wherein, on each side of the sealing body connected to the spring elements, the sealing body has at least one circular cross-sectional area which in each case corresponds to a cross-sectional area of the associated opening.

4. The hydraulic valve according to claim 3, wherein the first and the second sides of the sealing body are spherical segments.

5. A two-stage valve arrangement for activating a piston of a hydraulic piston/cylinder arrangement in an actuator for activating a high- or medium-voltage circuit breaker, the valve arrangement comprising:
    a pilot stage including at least one pilot valve; and
    a main stage including at least one main valve,
    wherein a first position of the at least one pilot valve is arranged such that a hydraulic connection will be established from a high-pressure tank to the piston/cylinder arrangement via the main stage so that a fluid at high pressure will be supplied to a space situated on one side of the piston, and
    a second position of the at least one pilot valve is arranged such that a space situated on one side of the piston will be connected to a low-pressure tank via the main stage,
    wherein a hydraulic valve according to claim 1 is arranged between an outlet side, connected to at least one control inlet of the main stage, and an outlet side, connected to the piston/cylinder arrangement, of the main stage.

6. The valve arrangement according to claim 5, wherein the pilot stage contains two 2/2-port valves.

7. A hydraulic actuator for activating a high- or medium-voltage circuit breaker comprising:
    a two-stage valve arrangement according to claim 5.

8. The hydraulic actuator of claim 7, which comprises:
    a hydraulic piston/cylinder arrangement.

9. The hydraulic actuator of claim 8, in combination with:
    a high- or medium-voltage circuit breaker; and
    a high-pressure tank arranged to be hydraulically connected to the piston/cylinder arrangement via the main stage.

* * * * *